United States Patent
Seel

(10) Patent No.: US 10,538,206 B2
(45) Date of Patent: Jan. 21, 2020

(54) CARGO SPACE DIVIDER NET WITH PULL OUT LIMITER

(71) Applicant: Macauto Industrical Co., Ltd., Tainan (TW)

(72) Inventor: Holger Seel, Wuppertal (DE)

(73) Assignee: Macauto Industrial Co., Ltd., Tainan (TW)

( * ) Notice: Subject to any disclaimer, the term of this patent is extended or adjusted under 35 U.S.C. 154(b) by 165 days.

(21) Appl. No.: 15/663,779

(22) Filed: Jul. 30, 2017

(65) Prior Publication Data

US 2018/0065562 A1  Mar. 8, 2018

(30) Foreign Application Priority Data

Sep. 7, 2016 (DE) .......................... 10 2016 116 775

(51) Int. Cl.
| | |
|---|---|
| *B60R 21/06* | (2006.01) |
| *E06B 9/88* | (2006.01) |
| *B60R 5/04* | (2006.01) |
| *E06B 9/68* | (2006.01) |

(52) U.S. Cl.
CPC .............. *B60R 5/047* (2013.01); *B60R 21/06* (2013.01); *E06B 9/68* (2013.01); *E06B 9/88* (2013.01)

(58) Field of Classification Search
CPC . B60R 5/047; B60R 21/06; E06B 9/88; E06B 9/68
USPC ........ 296/37.1, 37.16, 98; 160/290.1, 370.22
See application file for complete search history.

(56) References Cited

U.S. PATENT DOCUMENTS

| | | | | | |
|---|---|---|---|---|---|
| 529,517 | A | * | 11/1894 | Burrowes ................. | E06B 9/54 160/289 |
| 4,139,231 | A | * | 2/1979 | Lang ........................ | B60J 1/205 296/37.16 |
| 4,671,557 | A | * | 6/1987 | Lemp ...................... | B60R 5/047 160/323.1 |

(Continued)

FOREIGN PATENT DOCUMENTS

| | | |
|---|---|---|
| CN | 1245464 A | 2/2000 |
| CN | 1100684 C | 2/2002 |

(Continued)

*Primary Examiner* — Brent W Herring
(74) *Attorney, Agent, or Firm* — Von Rohrscheidt Patents

(57) ABSTRACT

A cargo space divider net configured to be arranged in a vehicle in a first mounting position or a second mounting position, the cargo space divider net including a winding shaft; a winding shaft housing in which the winding shaft is rotatably supported; a pull out profile; a web shaped net contexture which is arranged with a first edge at the winding shaft and with an edge that is remote from the winding shaft at the pull out profile; a retrieval drive which causes a wind up of the net contexture onto the winding shaft and against whose winding force the net contexture is pullable from the winding shaft into a first functional position or a second functional position as a function of a mounting position of the cargo space divider net in the motor vehicle; a pull out limiter which prevents a pull out travel of the net contexture beyond an amount that is necessary for reaching a functional position, wherein the cargo space divider net includes a detection device configured to detect the mounting position, wherein the detection device controls the pull out limiter as a function of the mounting position in order to correctly limit the pull out travel.

7 Claims, 12 Drawing Sheets

(56) References Cited

U.S. PATENT DOCUMENTS

| | | | | |
|---|---|---|---|---|
| 5,224,748 A * | 7/1993 | Decker | B60R 5/047 | 296/37.16 |
| 5,551,726 A * | 9/1996 | Ament | B60R 21/06 | 280/749 |
| 5,971,433 A * | 10/1999 | Ament | B60R 21/06 | 280/749 |
| 6,125,908 A * | 10/2000 | Ament | B60R 5/047 | 160/323.1 |
| 6,349,986 B1 * | 2/2002 | Seel | B60R 5/047 | 160/265 |
| 6,390,526 B1 * | 5/2002 | Ament | B60R 5/047 | 160/276 |
| 6,443,489 B1 * | 9/2002 | Ehrenberger | B60P 7/0823 | 280/749 |
| 6,598,921 B2 * | 7/2003 | Seel | B60P 7/083 | 160/291 |
| 6,715,525 B2 * | 4/2004 | Ehrenberger | B60R 21/06 | 160/23.1 |
| 6,834,705 B2 * | 12/2004 | Seel | B60J 1/2019 | 160/370.22 |
| 7,048,319 B2 * | 5/2006 | Ament | B60R 5/047 | 296/37.16 |
| 7,055,877 B2 * | 6/2006 | Sparrer | B60R 21/06 | 296/24.43 |
| 7,140,659 B2 * | 11/2006 | Walter | B60R 5/047 | 296/37.16 |
| 7,255,382 B2 * | 8/2007 | Ament | B60R 5/047 | 296/37.16 |
| 7,316,440 B2 * | 1/2008 | Walter | B60R 5/047 | 160/370.22 |
| 7,874,343 B2 * | 1/2011 | Hansen | B60J 1/2027 | 160/299 |
| 8,393,380 B2 * | 3/2013 | Uehara | B60J 7/0015 | 160/313 |
| 8,869,870 B2 * | 10/2014 | Wieczorek | B60J 1/2013 | 160/31 |
| 2002/0053407 A1 * | 5/2002 | Ehrenberger | B60R 21/06 | 160/24 |
| 2002/0067047 A1 * | 6/2002 | Seel | B60P 7/083 | 296/24.43 |
| 2002/0163220 A1 * | 11/2002 | Ament | B60R 5/047 | 296/37.16 |
| 2004/0069424 A1 * | 4/2004 | Seel | B60J 1/2019 | 160/370.22 |
| 2004/0232720 A1 | 11/2004 | Thiel | | |
| 2006/0208518 A1 * | 9/2006 | Ament | B60R 5/047 | 296/37.16 |
| 2007/0164581 A1 | 7/2007 | Ehrenberger | | |
| 2011/0100567 A1 * | 5/2011 | Asendorf | B60R 21/06 | 160/293.1 |
| 2012/0235440 A1 * | 9/2012 | Searfoss | B60J 7/085 | 296/100.18 |

FOREIGN PATENT DOCUMENTS

| | | |
|---|---|---|
| CN | 1343592 A | 4/2002 |
| CN | 1353059 A | 6/2002 |
| CN | 1572591 A | 2/2005 |
| CN | 1607129 A | 4/2005 |
| CN | 103253210 A | 8/2013 |
| DE | 19643691 C2 | 4/1998 |
| DE | 10044958 C2 | 4/2002 |
| DE | 10207575 A1 | 9/2003 |
| DE | 102006001029 B3 | 5/2007 |
| DE | 102009038066 B3 | 11/2010 |
| EP | 0649778 | 4/1995 |
| WO | WO9824660 A2 | 6/1998 |

* cited by examiner

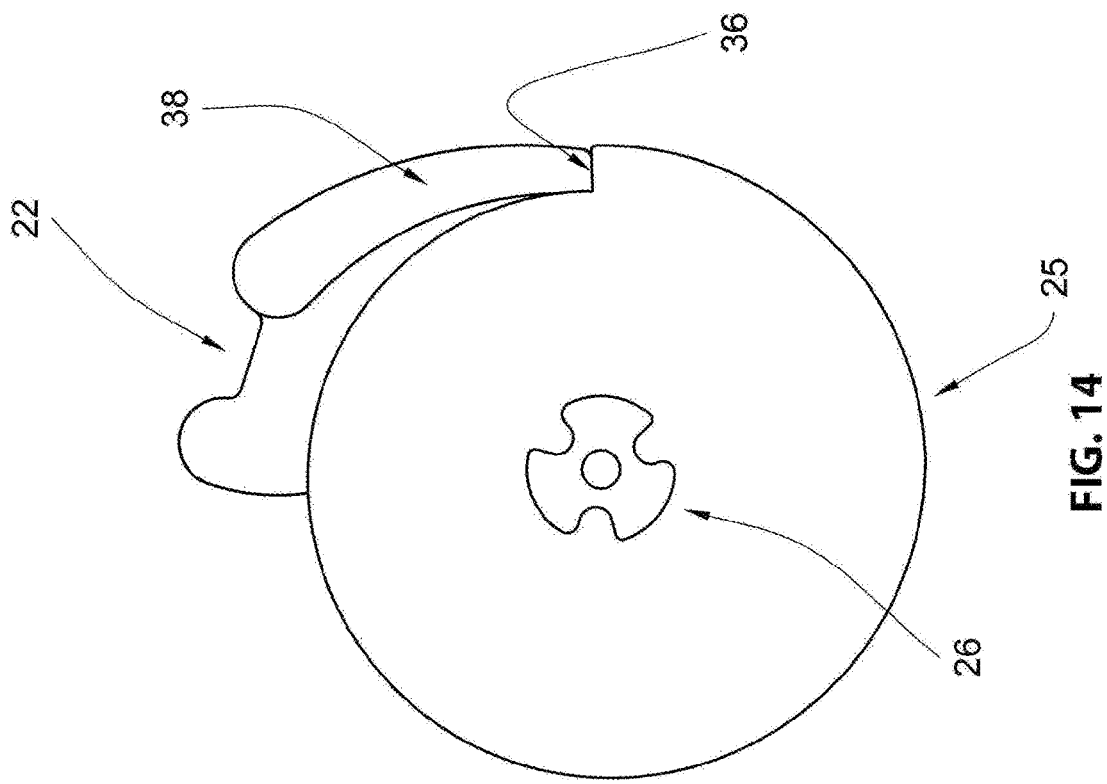
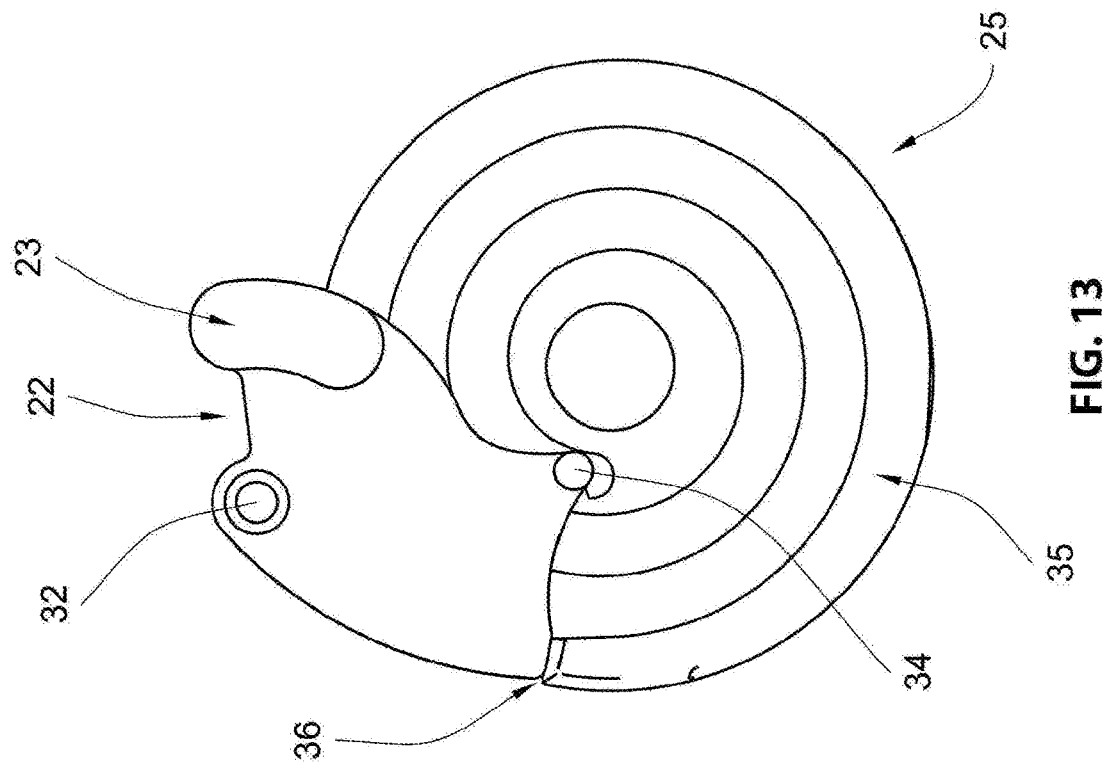

CARGO SPACE DIVIDER NET WITH PULL OUT LIMITER

RELATED APPLICATIONS

This application claims priority from and incorporates by reference German Patent Application DE10 2016 116 775.4 filed on Sep. 7, 2016.

FIELD OF THE INVENTION

The invention relates to a cargo space divider net for arrangement in a vehicle in a first mounting position or a second mounting position, the cargo space divider net including a winding shaft, a winding shaft housing in which the winding shaft is rotatably supported, a pull out profile, a web shaped net contexture which is arranged with a first edge at the winding shaft and with an edge that is remote from the winding shaft at the pull out profile, a retrieval drive which causes a wind up of the net contexture onto the winding shaft and against whose winding force the net contexture can be pulled off from the winding shaft depending from a mounting position of the cargo space divider net, a pull out limiter which prevents a pull out travel of the net contexture (18) beyond a dimension that is necessary for reaching a functional position.

BACKGROUND OF THE INVENTION

Cargo space divider nets are used for example in station wagons and SUVs in order to separate a cargo compartment from a passenger compartment and to prevent that cargo pieces that are transported in the cargo compartment are thrown into the passenger compartment by a rapid vehicle deceleration e.g. from strong breaking or accidents. In station wagons and SUVs the cargo space can be typically increased by moving the passenger seats or by folding down a second row of seats. Then typically also the cargo space divider net is moved within the vehicle in order to protect the passenger area that remains after the cargo space has been expanded.

There are cargo space divider nets which are attached at a rear bench or the second seat row and which are moved from a first mounting position into a second mounting position within the vehicle when they are moved back and forth or folded down. Alternatively it is known to attach the divider net independently from the passenger seats at least indirectly at the vehicle body. Also in this case there are at least two mounting positions provided by the manufacturer in order to secure the passenger space against luggage pieces when the cargo space is expanded.

In particular when the cargo space is expanded by folding the passenger seats over and attaching the cargo space divider net at the folded over passenger seats there is a greater cargo net pull out travel in this second mounting position compared to the first mounting position. On the winding shaft on which the cargo space divider net is stored there is still wound up divider net material in the first mounting position so that luggage pieces sliding into the divider net in the first mounting position can initially roll the divider net from the winding shaft and can thus move into the passenger space.

In order to prevent this various solutions have been shown in the art. Non-patent literature includes hook shaped protrusions at the winding shaft housing wherein the hook shaped protrusions engage the divider net recesses when the divider net is attached in the first mounting position and disposed in the functional position so that the protrusions prevent a further pull off for example when the luggage pieces penetrate into the divider net.

However, this pull out limiter poses an obstacle when moving the divider net into its functional position, thus during pull out. The user has to take care that the hooks do not already engage the net on the regular pull out path. Also the roll up of the divider net onto the winding shaft can be made more difficult by the engagement of a back side of the hooks. Overall handing is uncomfortable.

DE 19 643 691 C2 illustrates a generic cargo space divider net with a blocking device which acts upon the winding shaft. The blocking device can be triggered manually after pulling out the divider net and anchoring it in its functional position wherein the pull out can be initiated manually by actuating a push button. Thus, a locking catch engages a locking gear which prevents further pull out of the divider net from the winding shaft.

It is a problem that it is up to the user to make sure that the winding shaft is locked in the first mounting position. When the user forgets to lock the winding shaft, thus an operator error occurs, there is a substantial risk for injuring the passengers.

The principle of locking catch was used in DE 10 207 575 in a similar manner. However an engagement of the locking catch is controlled by a control curve and a motion delay device so that a manual interference of a user is not necessary. However, it is a disadvantage that the motion delay device makes the locking catch engage too early for example when the divider net is pulled off from the winding shaft so that the locking catch stops the pull out before the functional position of the divider net is reached. Furthermore the mechanism is configured rather complex which increases its propensity to fail.

Also, DE 10 044 958 C2 illustrates a cargo space divider net with a complex control of the pull out travel of the cargo space divider net.

BRIEF SUMMARY OF THE INVENTION

Thus, it is an object of the invention to provide a cargo space divider net whose pull out travel can be limited with simple means as a function of a mounting position of the cargo space divider net.

The object is achieved by cargo space divider net with the features of claim 1, in particular its characterizing features according to which the cargo space divider net has a detection device for detecting a mounting position wherein the detecting device controls the pull out limiter as a function of the mounting position in order to correctly limit the pull out travel.

It is an essential advantage of the invention that the mounting position of the cargo space divider net is detected by the detection device so that the pull out limiter of the net contexture is controllable based on the position detection.

Thus it is provided that a control device is associated with the winding shaft wherein the control device limits a pull out travel of the net contexture as a function of a control engagement of the detection device.

Thus, the control device releases the winding shaft for the necessary pull out of the net contexture as a function of the signal of the detection device but prevents a pull out that exceeds a necessary amount.

In particular it is provided that the detection device is a lever that is supported in the winding shaft housing wherein the lever can be moved into an operating position as a function of the mounting position of the cargo space divider net. A lever of this type provides a mechanical component with a particular simple configuration which provides position detection. Thus, it is initially provided that the lever includes a pivot axis which is supported within the winding shaft housing. The winding shaft housing, however, includes a recess from which a lever section exits. This lever section cooperates for example with attachment elements for arranging the cargo space divider net at the vehicle body. Thus, it can be provided that a lever section protruding relative to the winding shaft housing is moved into the winding shaft housing in a mounting position by inserting the divider net into the attachment device and the lever is moved into its operating position in this manner.

In particular it is provided that the lever includes a control pinion and a blocking element. The control pinion is provided for a cooperation with the control device so that the blocking element limits the pull out travel of the net contexture.

In an advantageous embodiment the control device includes a spiral shaped groove and a stop element.

The control device is advantageously a control disc that is connected torque proof with the winding shaft.

It is provided that the control pinion of the lever cooperates with the spiral groove of the control device and the blocking element of the lever cooperates with the stop element of the control device in order to limit the pull out travel of the net contexture.

Thus, it is provided that the control pinion engaging the spiral groove is movable by a pull out induced rotation of the control disc that is connected with the winding shaft in a direction of a rotation axis of the winding shaft and moves the blocking element into a blocking position where it contacts a stop of the control disc and limits the pull out travel.

Thus, the pull out limiter according to the invention functions in particular in that a control pinion of the lever engages the spiral groove in an operating position of the lever and that the blocking element of the lever contacts the stop element of the control device when a pull out travel of the net contexture that corresponds with the mounting position is reached.

Overall the invention is purely mechanical and therefore has a simple configuration. In its mounting position the lever is moved into its operating position which forces the control pinion to engage the spiral roof. When pulling the net contexture from the winding shaft into its functional position the spiral groove moves the control pinion in a direction of a geometric axis of rotation and thus moves the blocking element is a direction towards the stop element. When the blocking element and the stop element contact each other an additional pull off of the net contexture from the binding shaft is prevented. In the second mounting position the lever configured as the detection device has to be positioned so that the lever is not movable into its operating position so that the divider net can be pulled off from the winding shaft in its full length.

BRIEF DESCRIPTION OF THE DRAWINGS

Further advantages and a better comprehension of the invention can be derived from a subsequent description of an embodiment with reference to drawing figures:

FIGS. 13-14 illustrate a cooperation of the control disc and the lever in the locking position.

DETAILED DESCRIPTION OF THE INVENTION

Figure 1:
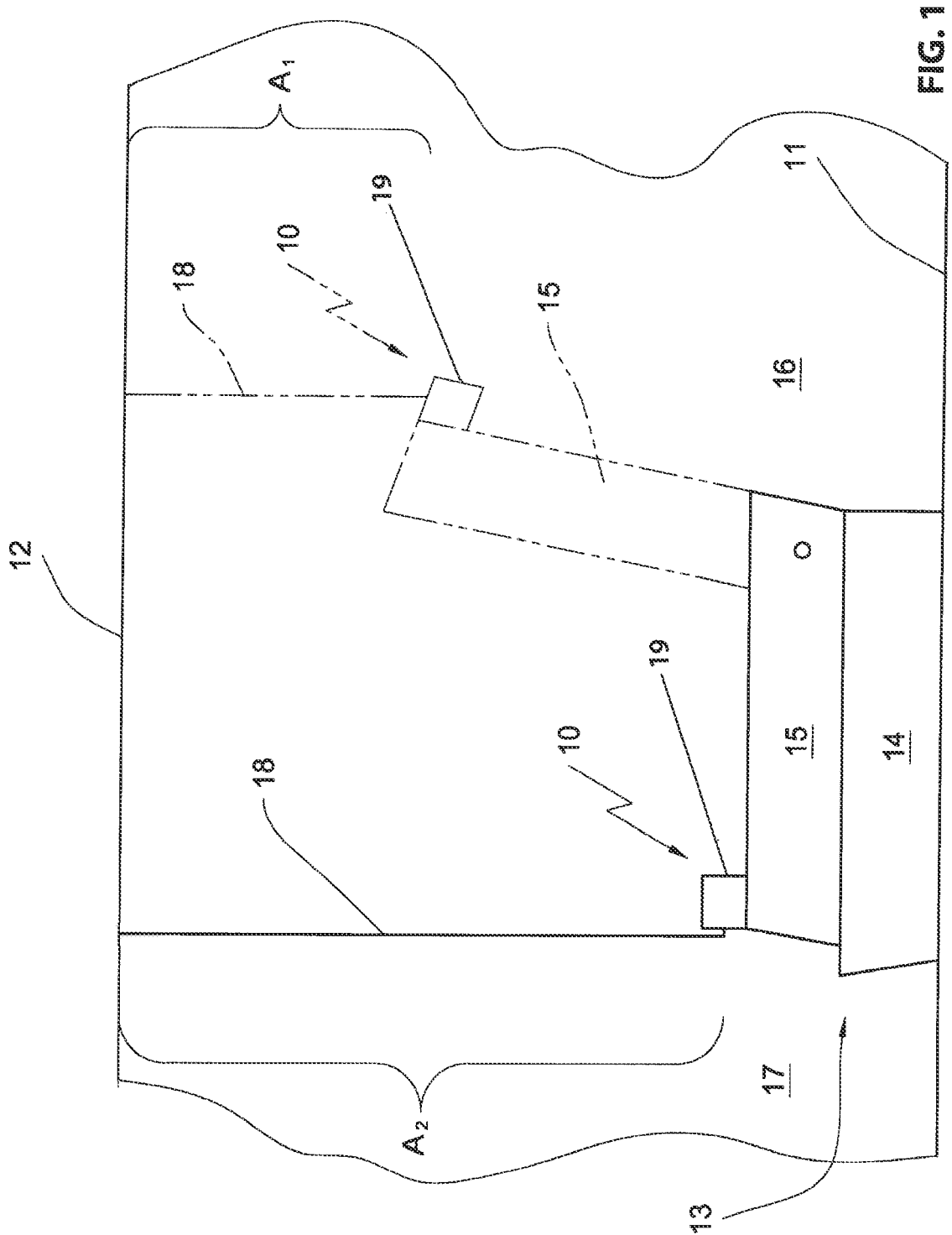
FIG. 1 illustrates a schematic representation of a cargo space divider net according to the invention that is attached at a vehicle seat.

In the drawing figures a cargo space divider net for a motor vehicle is designated overall with the reference numeral 10.

FIG. 1 illustrates the cargo space divider net in an exemplary and schematic installation situation in a motor vehicle. A floor 11 of the motor vehicle and a roof 12 of the motor vehicle are illustrated wherein a motor vehicle interior space extends between the floor 11 and the roof 12. A vehicle seat 13 is illustrated in the interior of the motor vehicle wherein the vehicle seat includes a seat cushion 14 and a back rest 15. The back rest 15 can be folded over in order to increase a size of a cargo space 16 arranged behind the back rest which supports the cargo space divider net 10 at a back side of the back rest that is oriented towards the cargo space.

FIG. 1 illustrates the vehicle seat 13 with folded over back rest 15 with the contour drawn in solid lines. The upright back rest 15 is drawn with a dashed contour.

When the back rest is upright the cargo space divider net 10 is in a first mounting position and thus divides the cargo space 16 from the passenger compartment 17 when the net contexture 18 is pulled off from a non-illustrated winding shaft into a dashed first functional position illustrated in FIG. 1 and attached at the vehicle roof 12.

Also when the back rest 15 is folded over, thus when the cargo space 16 of the motor vehicle is increased while reducing the passenger space 17 the net contexture 18 can be pulled off from the winding shaft and can be attached in a second functional position at the vehicle roof 12 so that the remaining cargo space 17 is separated from the increased cargo space 16.

The cargo space divider net 10 attached behind the back rest 15 is arranged in a first mounting position when the back rest 15 is upright and arranged in a second mounting position when the back rest 15 is folded down. A distance $A_1$ between the roof 12 and the winding shaft housing 19 of the cargo space divider net 10 in the first mounting position is smaller than a distance $A_2$ in the second mounting position when the back rest 15 is folded over. In the second mounting the net contexture 18 is pulled off from the winding shaft completely. In the first mounting position the net contexture 18 is pulled out only partially. Thus the pull out travel of the net contexture 18 in the first mounting position is smaller than in the second mounting position.

In order to prevent that luggage pieces impacting the network contexture 18 in the first mounting position cause an additional pull off of the network contexture from the winding shaft, thus the safety function of the divider net 10 is disabled, the cargo space divider net 10 according to the invention is provided with a pull of safety which is described infra.

Figure 2:
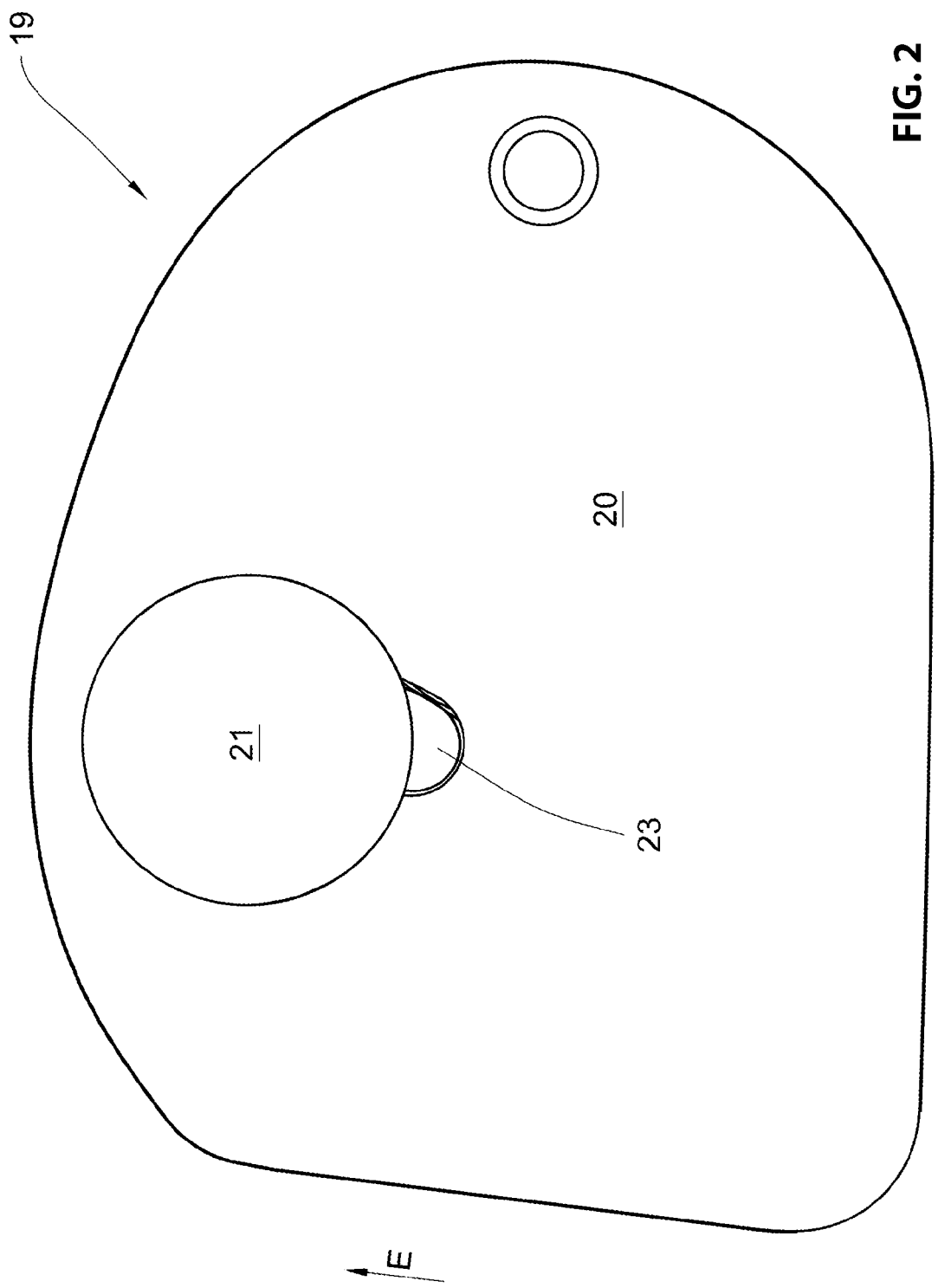
FIG. 2 illustrates a view of the winding shaft housing in a direction of the winding shaft axis.

FIG. 2 initially illustrates a side view of the winding shaft housing 19. The viewing direction is oriented in a direction of the rotating shaft of the winding shaft which is not illustrated. Initially an end cap 20 is visible which closes the winding shaft housing 19 at a face side and which includes an axially protruding support bolt 21. The support bolt 21 includes an opening through which a detection device can detect the mounting position of the cargo space divider net 10. In the instant embodiment a lever 22 forms the detection device, wherein a detection cam 23 of the lever exits through the opening of the support bolt 21.

Figure 3:
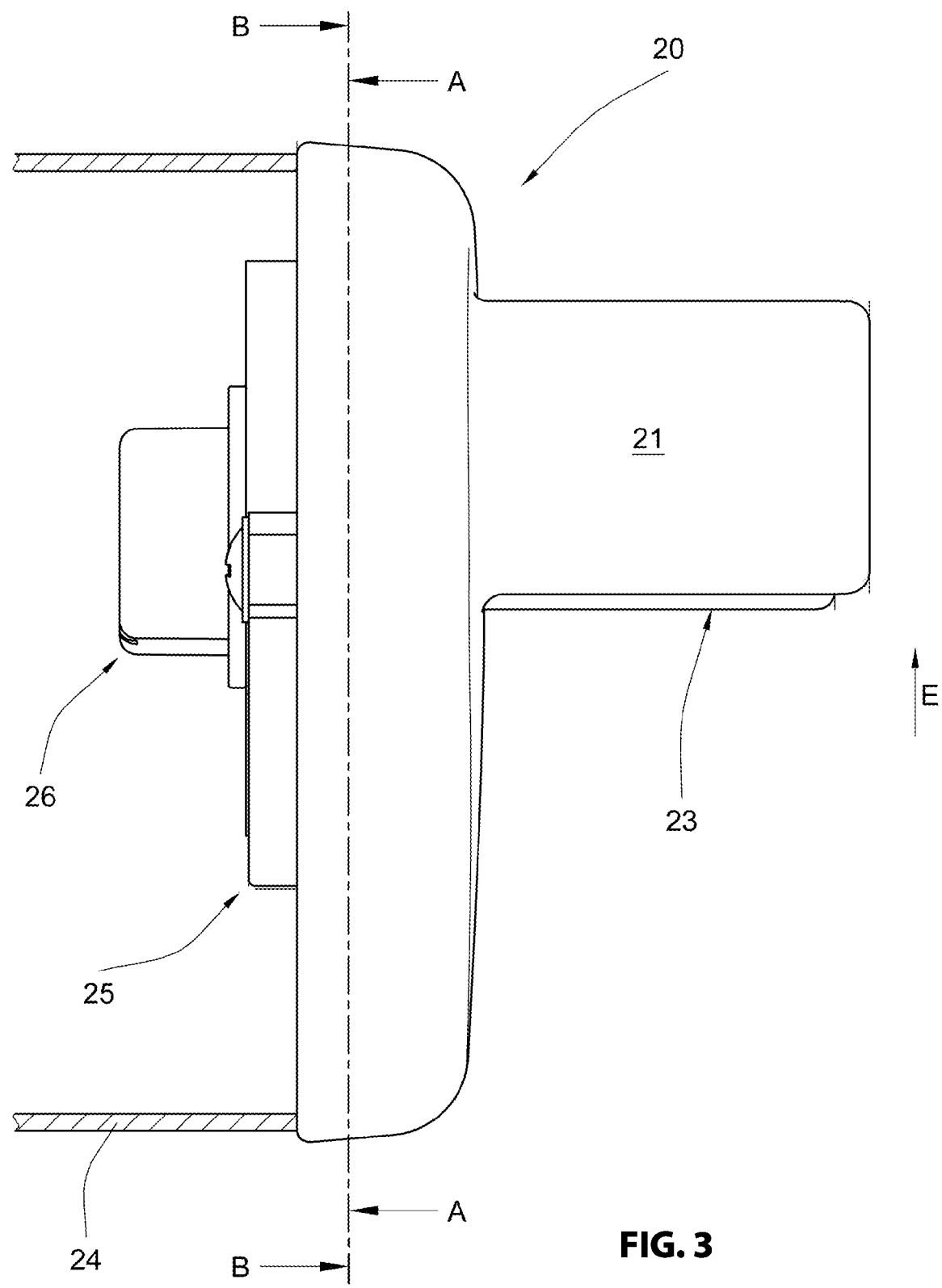
FIG. 3 illustrates a partial view of the winding shaft housing transversal to the winding shaft axis with the winding shaft housing in a sectional view.

FIG. 3 illustrates a side view of the winding shaft housing 19 in a partial view. The housing wall 24 was illustrated in a sectional view in order to facilitate a view into the winding shaft housing 19. The end cap 20, however, is illustrated in an uncut side view. It can also be derived from FIG. 3 that the detection cam 23 exits from a bottom side of a support bolt 21. Furthermore the end cap 20 supports a control device for limiting a pull out travel of the net contexture 18. The control device is implemented as a control disc 25 which includes a coupling member 26 providing torque proof connection with the non-illustrated winding shaft.

Figure 4:
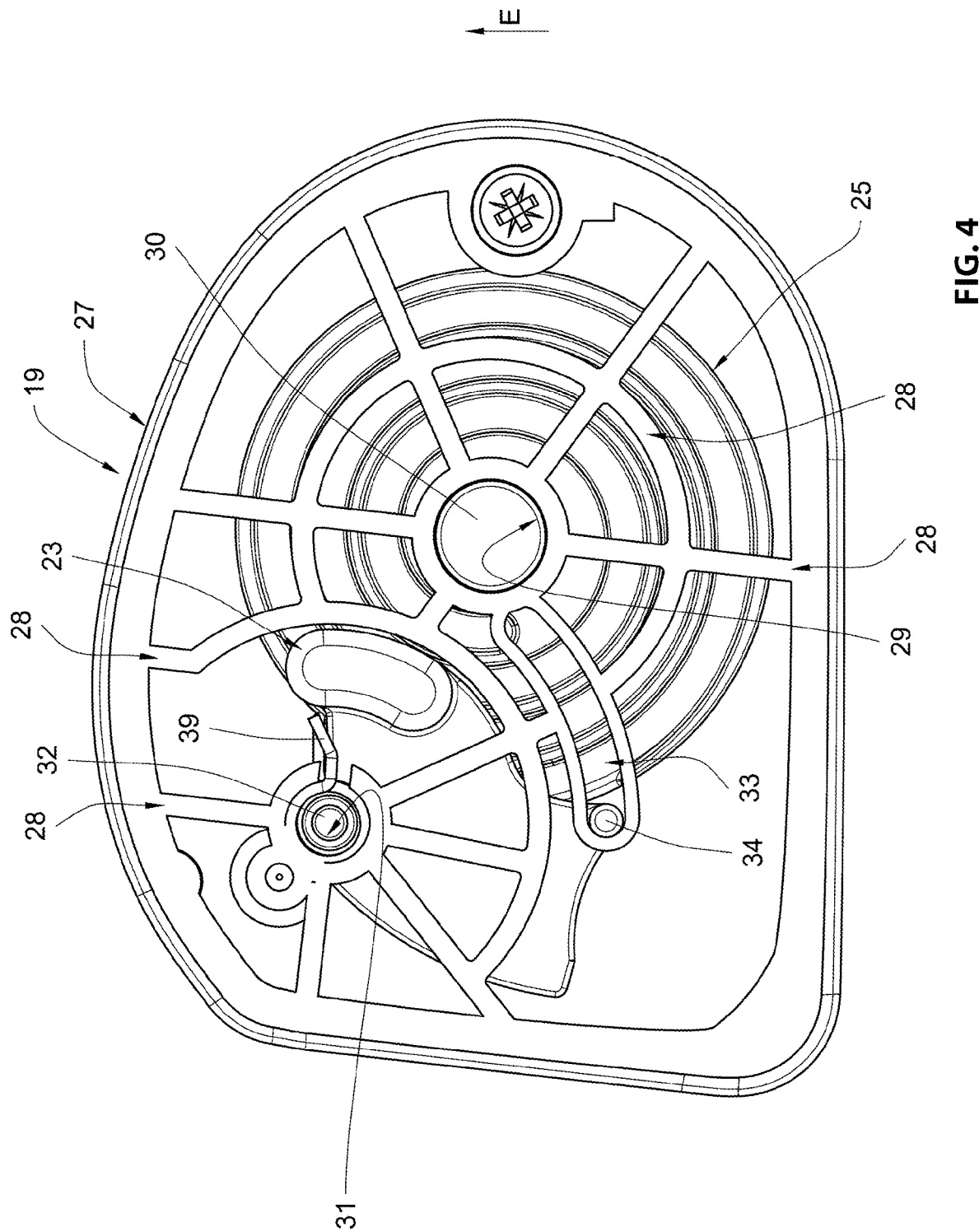
FIG. 4 illustrates a sectional view of the cap of the winding shaft housing according to the sectional line A-A in FIG. 3.

FIG. 4 illustrates the end cap 20 illustrated according to the sectional line A-A in FIG. 3, wherein the sectional line forms a support structure 28 covering the sectional plane adjacent to the outside cap wall 27.

The support structure 28 initially forms a first support 29 for the rotation axle 30 of the control disc 25. A second support 31 supports the pivot axle 32 of the lever 22. Last not least the support structure 28 forms a support groove 33 which cooperates with a support pinion 34 at the lever.

Figure 11:
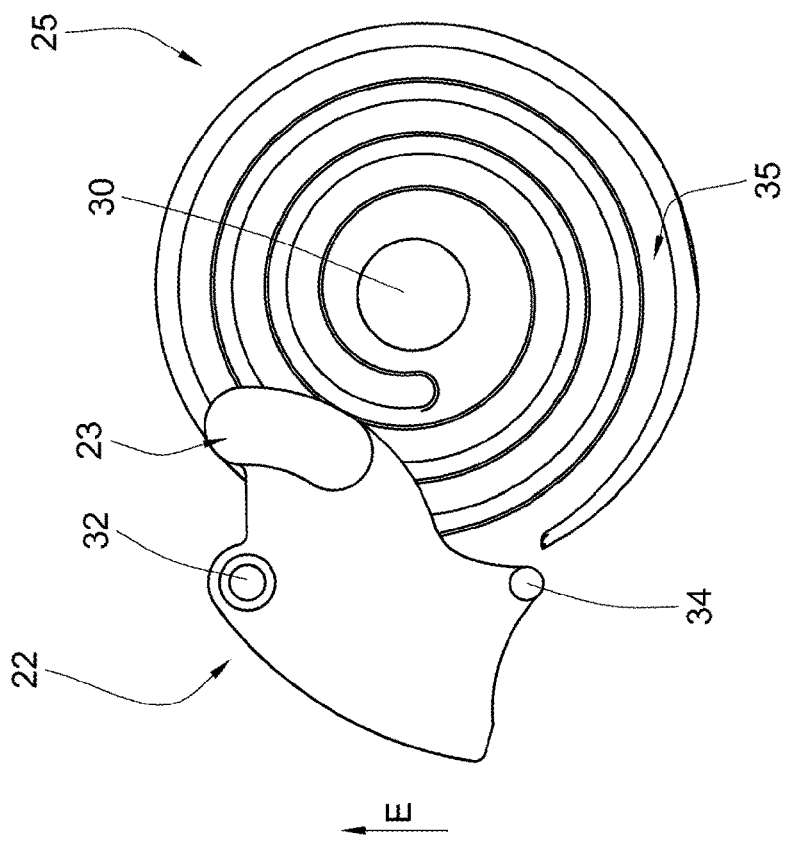

FIG. 11 illustrates the arrangement of lever 22 and control disc 25 according to FIG. 4. However, the support frame 28 of the end cap 20 is not illustrated. However, the surface portions of the lever 22 and the support disc 25 that are oriented in the direction of the end cap 20 are illustrated. The lever 22 forms the pivot axle 32 oriented towards the end cap 20. Also the support pinion 34 and the detection cam 23 originate from the lever 22 in a direction towards the end cap 20.

On its surface oriented towards the end cap 20 the control surface 25 forms a spiral groove 35 that runs towards the rotation axis 30.

Figure 12:
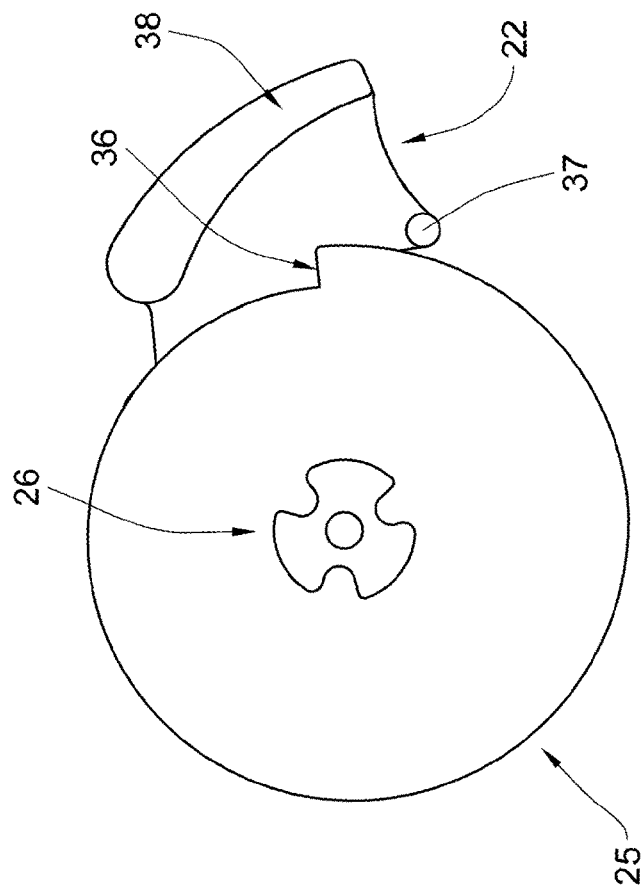
FIGS. 11-12 illustrate representations of a cooperation of the control disc and the lever in an idle position of the lever.

FIG. 12 illustrates the lever 22 and the control disc 25 in a view of its back side oriented towards the winding shaft. From the control disc 25 the coupling member 26 branches off in a direction towards the winding shaft wherein the coupling member provides a torque proof connection between the winding shaft and the control disc 25. The control disc 25 includes a stop element 36 configured as a step shaped recess on an outer circumference of the control disc. The lever 22 includes a control pinion 37 on a back side of the lever 22 wherein the control pinion protrudes in a direction towards the winding shaft and cooperates with the spiral groove 35. The lever 22 also includes a blocking element 38. The blocking element 38 is also recessed relative to a lever surface in a direction towards the winding shaft and thus approximately by an amount that corresponds to a thickness of the control disc 35. Furthermore, the blocking element 38 has a cambered contour wherein a curvature radius oriented towards the control disc 35 corresponds approximately to a radius of the control disc.

FIG. 4 illustrates that the lever 22 is retained in its resting position by a spring arm 39.

Figure 5:
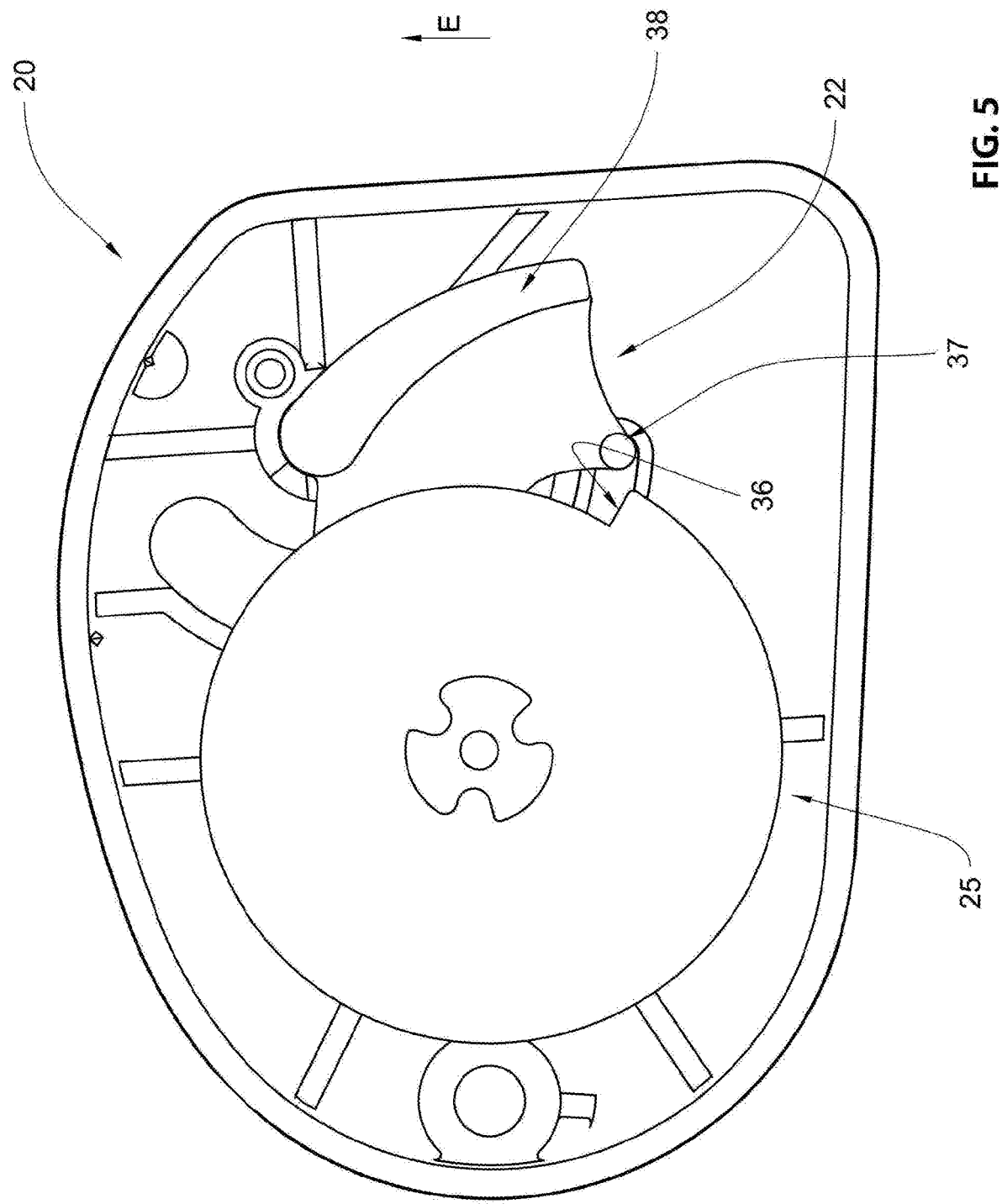
FIG. 5 illustrates a sectional view of the end cap of the winding shaft housing illustrated in FIG. 3 according to the sectional line B-B in FIG. 3.
Figure 6:
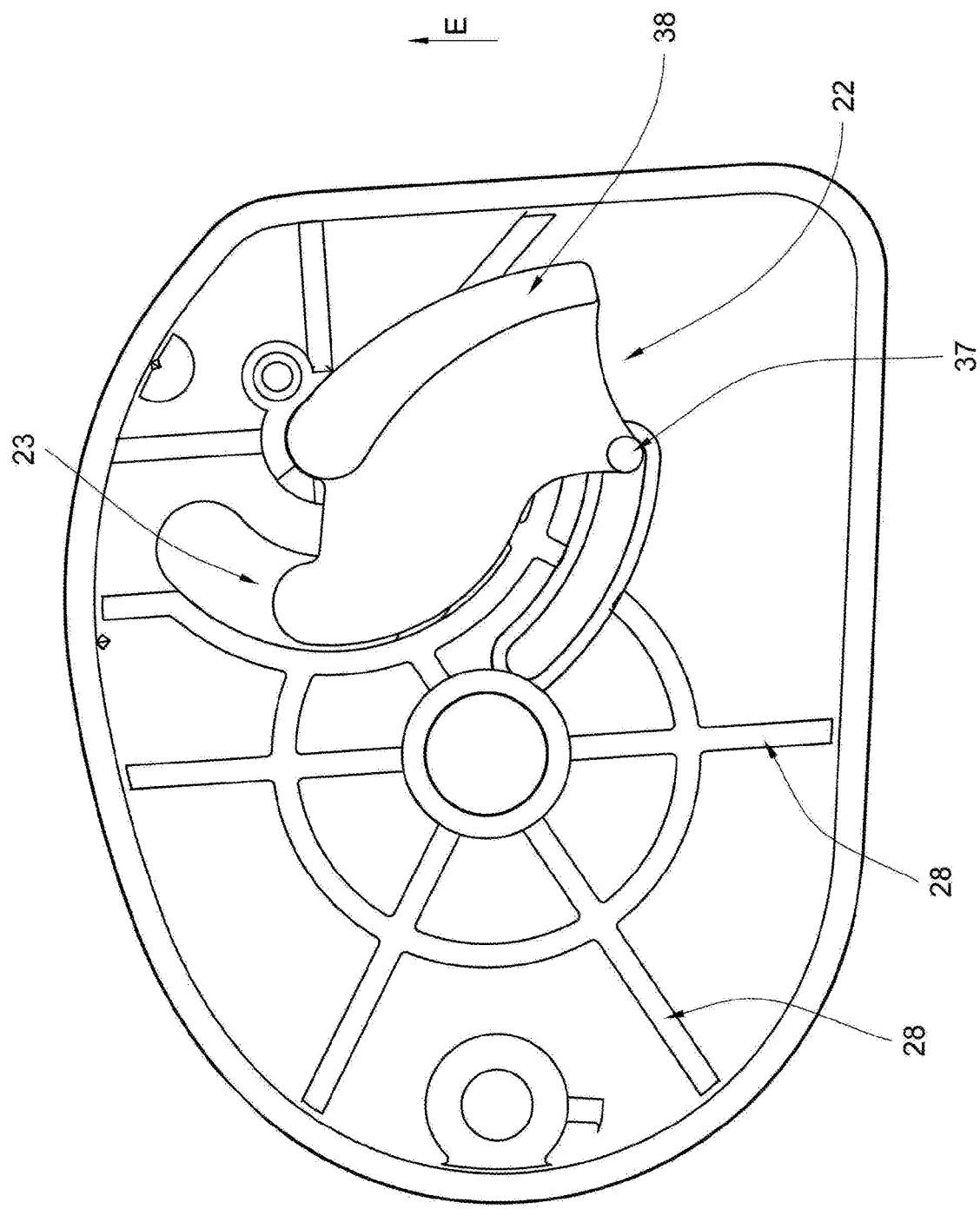
FIG. 6 illustrates a representation according to FIG. 5 with the control disc omitted.

FIGS. 5 and 6 illustrate a view of an inside of the end cap 20, thus a view in a direction towards an end cap 20 with the control disc 25 and the lever 22.

FIG. 6 illustrates a representation according to FIG. 5 omitting the control disc 25. A comparative view of FIGS. 5 and 6 in combination with FIGS. 3 and 11-14 shows that the lever 22 is arranged in viewing direction onto an inside of the end cap 20 behind the control disc 25. The blocking element and the control pinion 37 however extend into the plane of the control disc so that they can cooperate with the control disc.

The cargo space divider net 10 according to the invention, in particular the pull out travel limiter functions as follows.

In a first mounting position the winding shaft 19 of the cargo space divider net 10 is arranged at least indirectly at the vehicle body. Thus, the cargo space divider net can be attached at a back rest 15 of a vehicle seat 13 or it can be inserted for example in supports of the interior fairing. In any case a component is provided in the first mounting position that cooperates with the detection cam 23 and presses the detection cam 23 in a direction E and against the force of the spring arm 39 into its operating position.

Figure 7:
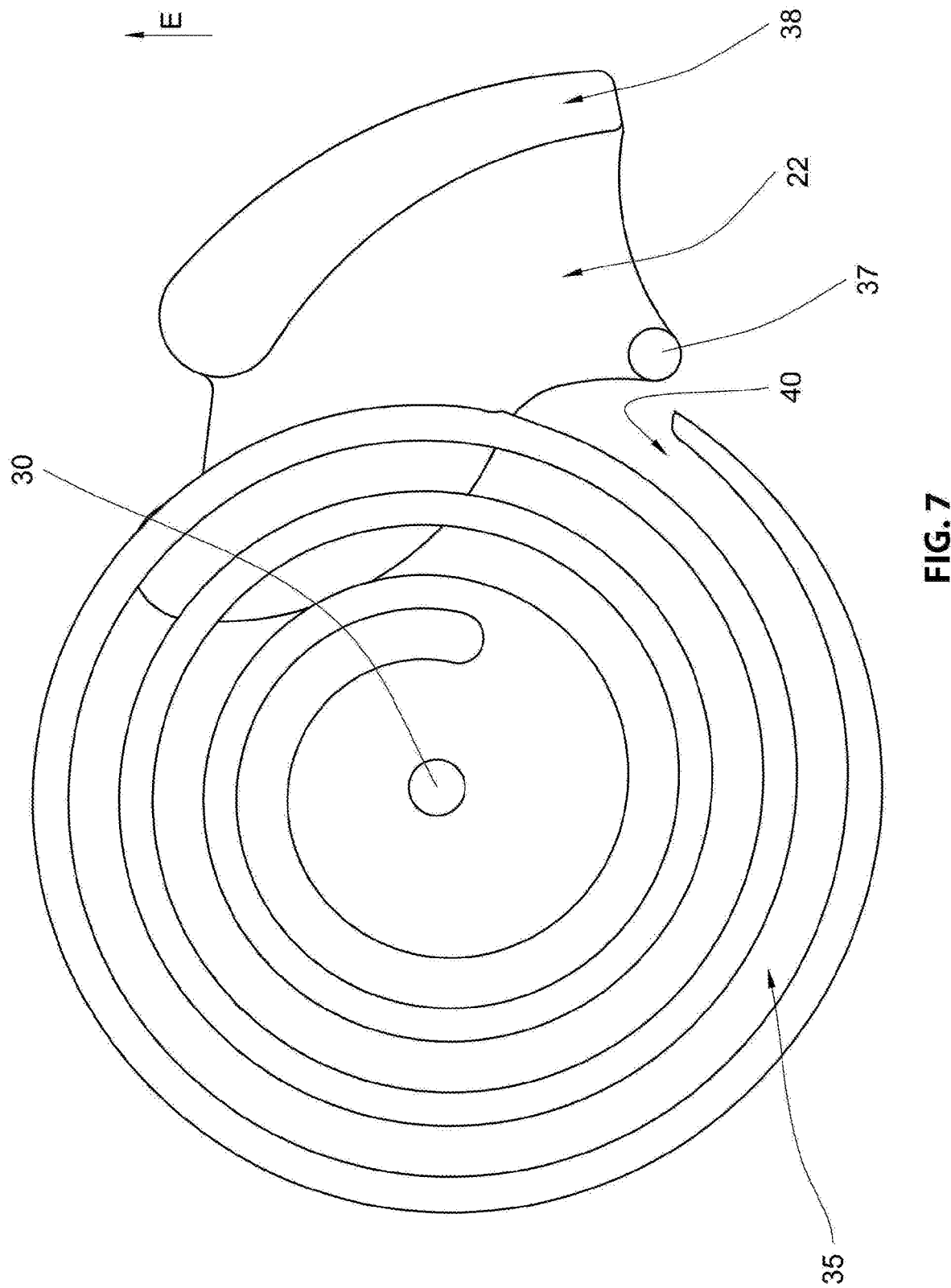
FIGS. 7-10 illustrate representations of a cooperation of the spiral groove profile and the control pinion in various positions.

The idle position is illustrated in FIG. 6. Thus, a movement of the detection cam 23 extending into the paper plane leads to a clockwise movement wherein the support pin 34 slides along in the support groove 33 and stabilizes the pivot movement (c.f. FIG. 3), due to the mirrored view compared to FIG. 6 the movement is counter clockwise. The control pin 37 is now arranged in the portion of the entry 40 of the spiral groove 35. The cooperation of spiral groove 35 and control pin 37 is now described with reference to FIGS. 7-10 which only illustrate the spiral groove 35 and the lever 22 of the control disc 25. FIG. 7 illustrates a resting position of the lever 22, FIG. 8 illustrates the angular position of the lever 22 with control pins 37 arranged in front of an entry 40 of the spiral groove 35.

Figure 8:
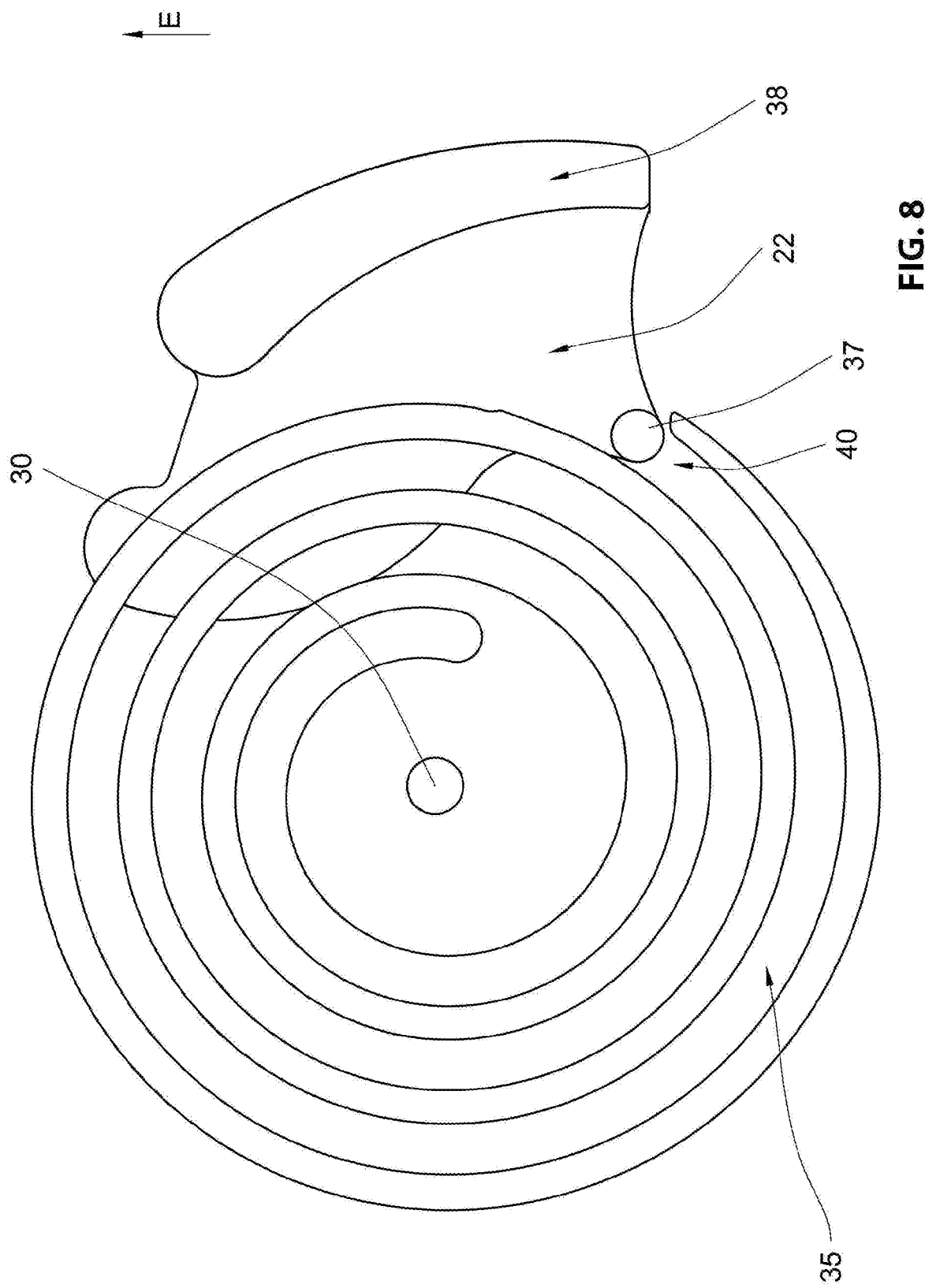
Figure 9:
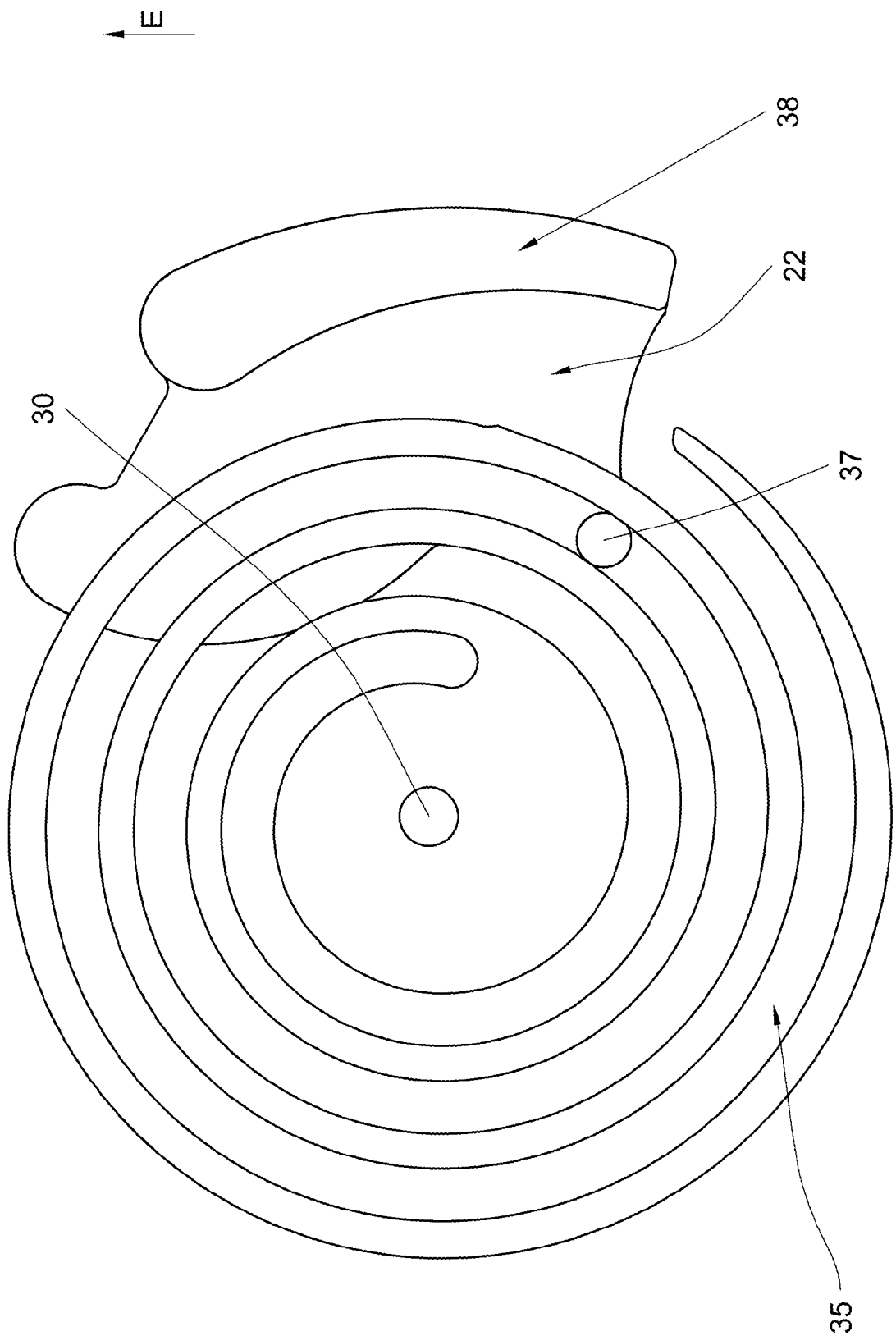
Figure 10:
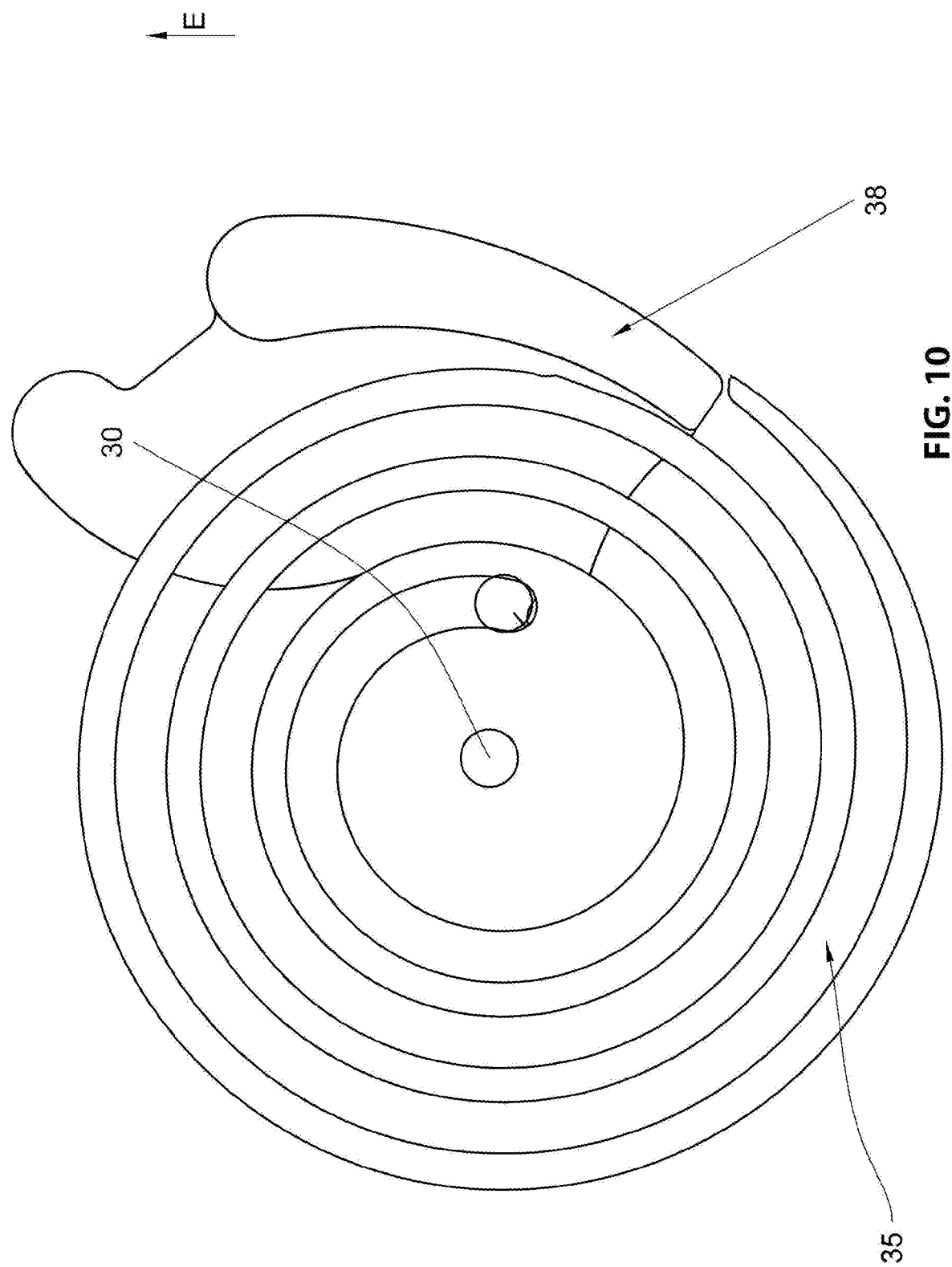

By arranging the cargo space divider net 10 in its first mounting position the lever 22 is arranged in its operating position (FIG. 8). When the net contexture 18 is pulled off from the non-illustrated winding shaft the control disc 25 that is rotationally connected with the winding shaft is moved about its rotation axle 30 which is performed counter clock wise in the illustrations according to FIGS. 7-10 as well as in FIG. 4. The control pin 37 penetrates into the spiral groove 35 and is moved by the spiral groove 35 in a direction towards the rotation axis 30 of the control disc 35, (FIG. 9). Thus, the control pin 37 moves the lever 22 accordingly. While the lever 22 is displaced according to the illustration selected in FIGS. 7-10 behind the control disc 25 the lever side blocking element 38 which protrudes relative to the lever 22 in a direction towards the winding shaft moves in a direction towards the stop element 36. When the blocking element 38 is arranged at the stop element 36 according to FIGS. 13 and 14 the lever 22 is in its locking position in which a further rotation of the winding shaft and thus an additional pull off of the net contexture 18 is prevented. Another rotation of the control disc 25 and of the winding shaft rotationally connected with the control disc 25 is not possible. The pull out travel of the net contexture 18 is thus limited effectively.

In the second mounting position a component is missing which cooperates with the detection cam 23 and which is arranged at the interior fairing so that the lever 22 remains in its idle position that is maintained by the spring arm 39. Therefore the control pin 37 does not engage the spiral groove 35 so that the blocking element 38 is not moved in a direction towards the stop element 36. The net contexture 18 can thus be pulled out until it is pulled off from the winding shaft completely.

It is theoretically conceivable that the lever 22 is moved into the operating position by gravity so that a change of the installed position of the cargo space divider net 10 causes a pivoting between the operating position and the idle position when the mounting position is changed. A component arranged at the body which cooperates with the detection cam 23 in the first mounting position can then be omitted.

Overall the invention provides a cargo space divider net 10 with a simple and reliable device for limiting a pull out travel of the net contexture 18. The pull out travel limiter is triggered as a function of the mounting position of the cargo space divider net 10 so that an operator error is excluded as long as the cargo space divider net 10 is mounted correctly.

REFERENCE NUMERALS AND DESIGNATIONS

10 cargo space divider net
11 floor of motor vehicle
12 roof of motor vehicle
13 vehicle seat
14 seat cushion
15 back rest
16 cargo space
17 passenger space
18 net contexture
19 winding shaft housing
20 end cap
21 support bolt
22 lever
23 detection cam
24 housing wall
25 control disc
26 coupling member
27 outside cap wall
28 support structure
29 first support
30 rotation axis
31 second support
32 pivot axis
33 support groove
34 support pinion
35 spiral groove
36 stop element
37 control pinion
38 blocking element
39 spring arm
40 inlet of 35
$A_1$ distance in first mounting position
$A_2$ distance in second mounting position
E move in direction

What is claimed is:

1. A cargo space divider net for a vehicle, the cargo space divider net comprising:
    a winding shaft;
    a winding shaft housing in which the winding shaft is rotatably supported wherein the winding shaft housing is arrangeable in the vehicle in a first mounting position or a second mounting position;
    a pull out profile;
    a web shaped net contexture which is arranged with a first edge at the winding shaft and with an edge that is remote from the winding shaft at the pull out profile;
    a retrieval drive which causes a wind up of the net contexture onto the winding shaft and against whose winding force the net contexture is pullable from the winding shaft into a first functional position or a second functional position as a function of the first mounting position or the second mounting position of the winding shaft housing in the vehicle;
    a pull out limiter which prevents a pull out travel of the net contexture beyond an amount that is necessary for reaching the first functional position or the second functional position,
    wherein the cargo space divider net includes a detection device configured to detect the first mounting position of the winding shaft housing or the second mounting position of the winding shaft housing in the vehicle, and
    wherein the detection device controls the pull out limiter as a function of the first mounting position of the winding shaft housing or the second mounting position of the winding shaft housing in the vehicle in order to correctly limit the pull out travel,
    wherein the detection device is a lever that is supported in the winding shaft housing,
    wherein the lever is displaced into an operating position as a function of the first mounting position of the winding shaft housing or the second mounting position of the winding shaft housing in the vehicle,
    wherein a control device is associated with the winding shaft wherein the control device limits the pull out travel of the net contexture as a function of a controlling engagement of the detection device,
    wherein the lever is integrally provided in one piece with a control pin and a blocking element, and
    wherein the blocking element of the lever cooperates with the stop element of the control device so that the pull out travel of the net contexture is limited.

2. The cargo space divider net according claim 1, wherein the control device includes a spiral shaped groove.

3. The cargo space divider net according to claim 1,
    wherein a control device is associated with the winding shaft,
    wherein the control device limits the pull out travel of the net contexture as a function of a controlling engagement of the detection device,
    wherein the control device includes a spiral shaped groove and a stop element, and
    wherein the control pin of the lever cooperates with the spiral groove of the control device and the blocking element of the lever cooperates with the stop element of the control device so that the pull out travel of the net contexture is limited.

4. The cargo space divider net according to claim 3, wherein the control pin of the lever engages the spiral groove in an operating position of the lever and the blocking element of the lever contacts the stop element of the control device when reaching the pull out travel of the net contexture corresponding to the mounting position.

5. The cargo space divider net according to claim 4,
    wherein a control device is associated with the winding shaft wherein the control device limits the pull out travel of the net contexture as a function of a controlling engagement of the detection device, wherein the control device is a control disc arranged on the winding shaft and connected torque proof with the winding shaft, and wherein the control pin pinion that engages the spiral groove is movable in a direction towards a rotation axis of the winding shaft by a pull out induced rotation of the control disc connected with the winding shaft and moves the blocking element into a blocking position where the blocking element contacts a stop of the control disc and limits a pull out travel.

6. The cargo space divider net according to claim 1, wherein the control device is a control disc arranged on the winding shaft and connected torque proof with the winding shaft.

7. A cargo space divider net for a vehicle, the cargo space divider net comprising:
- a winding shaft;
- a winding shaft housing in which the winding shaft is rotatably supported wherein the winding shaft housing is arrangeable in the vehicle in a first mounting position or a second mounting position;
- a pull out profile;
- a web shaped net contexture which is arranged with a first edge at the winding shaft and with an edge that is remote from the winding shaft at the pull out profile;
- a retrieval drive which causes a wind up of the net contexture onto the winding shaft and against whose winding force the net contexture is pullable from the winding shaft into a first functional position or a second functional position as a function of the first mounting position or the second mounting position of the winding shaft housing in the vehicle;
- a pull out limiter which prevents a pull out travel of the net contexture beyond an amount that is necessary for reaching the first functional position or the second functional position;
- a detection device configured to detect the first mounting position of the winding shaft housing or the second mounting position of the winding shaft housing in the vehicle through a direct mechanical contact of the detection device with a component of the vehicle that is separate from the cargo space divider net, and wherein the detection device controls the pull out limiter as a function of the first mounting position of the winding shaft housing or the second mounting position of the winding shaft housing in the vehicle in order to correctly limit the pull out travel, wherein the detection device is a lever that is supported in the winding shaft housing, wherein the lever is displaced into an operating position as a function of the first mounting position of the winding shaft housing or the second mounting position of the winding shaft housing in the vehicle, wherein a control device is associated with the winding shaft wherein the control device limits the pull out travel of the net contexture as a function of a controlling engagement of the detection device, wherein the lever is integrally provided in one piece with a control pin and a blocking element, and wherein the blocking element of the lever cooperates with the stop element of the control device so that the pull out travel of the net contexture is limited.

* * * * *